(12) United States Patent
Vesterinen

(10) Patent No.: US 9,008,103 B2
(45) Date of Patent: Apr. 14, 2015

(54) LINK LAYER SWITCHING FOR LOCAL BREAKOUT

(75) Inventor: Seppo Ilmari Vesterinen, Oulunsalo (FI)

(73) Assignee: Nokia Siemens and Networks Oy, Espoo (FI)

( * ) Notice: Subject to any disclaimer, the term of this patent is extended or adjusted under 35 U.S.C. 154(b) by 93 days.

(21) Appl. No.: 13/148,386

(22) PCT Filed: Feb. 9, 2009

(86) PCT No.: PCT/EP2009/000885
§ 371 (c)(1),
(2), (4) Date: Aug. 8, 2011

(87) PCT Pub. No.: WO2010/088926
PCT Pub. Date: Aug. 12, 2010

(65) Prior Publication Data
US 2011/0310843 A1    Dec. 22, 2011

(51) Int. Cl.
  *H04L 12/28*  (2006.01)
  *H04L 12/56*  (2006.01)
  *H04W 92/02*  (2009.01)
  *H04W 8/08*   (2009.01)
  *H04W 84/04*  (2009.01)
  *H04W 88/00*  (2009.01)

(52) U.S. Cl.
  CPC .............. *H04W 92/02* (2013.01); *H04W 8/082* (2013.01); *H04W 84/045* (2013.01); *H04W 88/005* (2013.01)

(58) Field of Classification Search
  USPC ................................. 370/328, 338, 401, 469
  See application file for complete search history.

(56) References Cited

U.S. PATENT DOCUMENTS

| 2004/0023639 A1* | 2/2004 | Noel, Jr. .................... 455/410 |
| 2008/0002642 A1  | 1/2008 | Borkar et al. ............... 370/338 |
| 2008/0151914 A1  | 6/2008 | Cho et al. ................... 370/401 |

(Continued)

FOREIGN PATENT DOCUMENTS

| JP | 2006333406 A | 12/2006 |
| JP | 2007135076 A | 5/2007 |

(Continued)

OTHER PUBLICATIONS

3GPP TS 22.220 V1.0.1 (Dec. 2008), 3rd Generation Partnership Project; Technical Specification Group Services and System Aspects; Service requirements for Home NodeBs and Home eNodeBs, (Release 9), (21 pages).

(Continued)

*Primary Examiner* — Warner Wong
(74) *Attorney, Agent, or Firm* — Harrington & Smith

(57) ABSTRACT

The present invention relates to a method, an apparatus, and a computer program product for providing access via a cellular access network to a packet-switched network, wherein a terminal-specific connection-oriented point-to-point link is set up between a terminal device and a cellular base station device, and the terminal-specific connection-oriented point-to-point link is switched at the cellular base station device on a link layer level to the packet-switched network, so that a point of attachment for said terminal device is located in the packet-switched network. Furthermore, a terminal-specific termination point for the packet-switched network is provided at the cellular base station device.

19 Claims, 4 Drawing Sheets

(56) References Cited

U.S. PATENT DOCUMENTS

| | | | |
|---|---|---|---|
| 2009/0154496 A1* | 6/2009 | Fujinami | 370/469 |
| 2010/0128708 A1* | 5/2010 | Liu et al. | 370/338 |
| 2010/0128709 A1* | 5/2010 | Liu et al. | 370/338 |
| 2010/0195621 A1* | 8/2010 | Kekki et al. | 370/332 |
| 2011/0176531 A1* | 7/2011 | Rune et al. | 370/338 |

FOREIGN PATENT DOCUMENTS

| | | |
|---|---|---|
| WO | WO 2006/132503 A1 | 12/2006 |
| WO | WO 2008/125729 A1 | 10/2008 |
| WO | WO 2008/132163 A1 | 11/2008 |
| WO | WO-2008/142620 A2 | 11/2008 |

OTHER PUBLICATIONS

IEEE Std 802.3-2008 (Revision of IEEE Std 802.3-2005) "IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications" LAN/MAN Standards Committee, IEE Computer Society, Approved Sep. 26, 2008, IEEE-SA Standards Board; pp. 1-2997.

Japan Patent Office, Official Action for Japanese Patent Application No. 2014-000504, Aug. 15, 2014, 4 pages.

Nakamura & Partners, English Translation of Official Action for Japanese Patent Application No. 2014-000504, Aug. 15, 2014, 5 pages.

3GPP TS 23.401 V8.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 8)", Sep. 2008, 204 pages.

* cited by examiner

LINK LAYER SWITCHING FOR LOCAL BREAKOUT

FIELD OF THE INVENTION

The present invention relates to a method, an apparatus and a computer program product for providing access via a cellular access network to a packet-switched network, such as—but not limited to—Universal Mobile Communications System (UMTS) or Long Term Evolution (LTE) or Local Area Network (LAN) networks.

BACKGROUND OF THE INVENTION

Home base stations, Home NodeBs, Femto eNodeBs (eNBs) or any type of home access device (in the following referred to as "HNB") have become a widely discussed topic within $3^{rd}$ Generation Partnership Project (3GPP) as well as in the operator and manufacturer community. When deployed in homes and offices, HNBs allow subscribers to use their existing handsets—in a building—with significant improved coverage and increased broadband wireless performance. Moreover, Internet Protocol (IP) based architecture allows deployment and management in virtually any environment with broadband Internet service.

In current standardization activities, deployment scenarios involving Femto Base Stations in the context of 3G and LTE is attracting great interest from manufacturers and operators. The current status in 3GPP standardization activities is that HNB deployment has been acknowledged by several working groups and official documents have been drafted to capture the requirements concerning such HNB deployments.

In 3GPP specification TS 22.220, local IP access in home based networks has been described, wherein local IP breakout (LBO) from HNB to home based networks or to the Internet has been suggested in addition to ordinary IP based services via the operator's core network. Allowing for local breakout (also referred to as "route optimization") of IP traffic could both shorten the end-to-end route and reduce the load on relatively expensive IP backbones (which inherently provides a high quality of service).

Local IP access is intended to differentiate user's local IP traffic in the HNB so that local IP traffic to/from IP devices connected to home based networks is forwarded on the shortest path so that it does not transit outside the home based network (i.e. remains Intranet traffic). Moreover, local IP access traffic to the Internet does not necessarily transit across the operator's evolved packet core (EPC), i.e., the Internet traffic would be forwarded to and received from the Internet via a gateway local to a base station without having to transit through the operator's core nodes.

The current 3GPP specifications and contributions suggest integrating a General Packet Radio Services (GPRS) Gateway Support Node (GGSN) or another kind of gateway function into the HNB for implementing local breakout to home based networks or to the Internet. However, implementing a local gateway for local IP access into the HNB requires incorporation of lots of gateway functions (such as tunnelling, charging, Home Agent etc.), so that complexity and processing load is increased and an agreed split between radio access network (RAN) and core network is violated. Furthermore, gateway devices are modelled as IP routers that perform IP lookup for routing user traffic to/from 3GPP specified bearer services. Thus, if local breakout was done at a GGSN-like IP router function in the HNB, this would lead to the disadvantage that every kind of inter HNB handover will result in a change of GGSN and thus require use of a cell reselection procedure. In other words, modelling a local gateway functionality within the HNB as an IP router would limit IP mobility and session continuation to work just when the served terminal device (e.g. user equipment (UE)) is connected to the current HNB. This would lead to a severe limitation e.g. in local area scenarios like in an office or campus where local IP access could be served through a multiple cells or base stations in the local area.

SUMMARY

Among others, it is an object of the present invention to provide a simplified gateway functionality in a base station device so that gateway management can be handled locally with minimal modifications of interfaces.

This object is achieved by an apparatus comprising:
radio interface means for setting up a terminal-specific connection-oriented point-to-point link to provide access via a cellular access network to a packet-switched network;
link layer processing means for switching said terminal-specific connection-oriented point-to-point link on a link layer level to a packet-switched network, so that a point of attachment for said access is located in said packet-switched network; and
network interface means for providing a terminal-specific termination point for said packet-switched network.

Furthermore, the above object is achieved by a method comprising:
setting up a terminal-specific connection-oriented point-to-point link between a terminal device and a cellular base station device to provide access via a cellular access network to a packet-switched network;
switching said terminal-specific connection-oriented point-to-point link at said cellular base station device on a link layer level to said packet-switched network, so that a point of attachment for said terminal device is located in said packet-switched network; and
providing at said cellular base station device a terminal-specific termination point for said packet-switched network.

Additionally, the above object is achieved by a computer program product comprising code means for producing the above method steps when run on a computing device, which can be any software-controlled device. The computer program product may be a software routine downloadable from a network system or stored on a computer readable storage medium.

Accordingly, when the base station device (e.g. HNB) is provided with a link layer switching means or function (e.g. a L2 switch), its architecture can be simplified substantially in comparison to a gateway or router functionality, since it does not need to run any routing protocol, perform any router advertisements etc. In uplink direction the base station device just forwards local access traffic directly to its network interface in the packet-switched network (e.g. a local access network). Neither a tunnelling protocol nor any other kind of tunnelling procedure is required in the base station device. The proposed switching means or functionality can be seen as a link layer bridging function, so that the routing or router function can be separated from the physical base station device and shifted to an external node, and so that multiple base station devices can be connected the same packet-switched network (e.g. LAN). The terminal device may use the same network address for local access service in all base station devices connected to the same subnet. This means that mobility with session continuation can be handled simply at link layer when inter base station handovers happen within the same subnet.

The suggested simple link layer switching or bridging functionality between the access link towards the packet-switched network and the point-to-point radio link requires less processing power in the base station device, because network layer processing (e.g. L3 processing) can be omitted in the base station device.

The link layer processing means may be configured to handle handover-related session continuation at the link layer level.

Furthermore, network layer processing means may be provided for performing network layer protocol lookup in order to forward user downlink traffic to a corresponding terminal-specific connection-oriented point-to-point link over the radio interface means.

Additionally or alternatively, the link layer processing means may be configured to derive a forward decision for user downlink traffic from the packet-switched network to a corresponding terminal-specific connection-oriented point-to-point link from an assigned terminal-specific link layer address.

The apparatus may further be configured to forward received access traffic directly via the network interface means to the packet-switched network.

Scheduling of the over-the-air transmission can be achieved by the radio interface means by using link layer frame information.

Additionally, header processing means may be provided for deriving switching information for the link layer processing means based on received link layer headers.

In a specific example, the network interface means may be configured to emulate a terminal-specific Ethernet interface towards the packet-switched network.

The link layer processing means may further be configured to perform user traffic mapping to the terminal-specific connection-oriented point-to-point link at the link layer level based on link layer addresses.

In addition, network layer processing means may be provided for at least one of mapping marked network layer user packets to corresponding link layer services and performing application layer header compression and ciphering. More specifically, the network layer processing means may be configured to derive a decision for forwarding traffic to the terminal-specific connection-oriented point-to-point link based on a mapping of application layer addresses to link layer addresses.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on an exemplary and non-limiting LTE network architecture.

Figure 1:
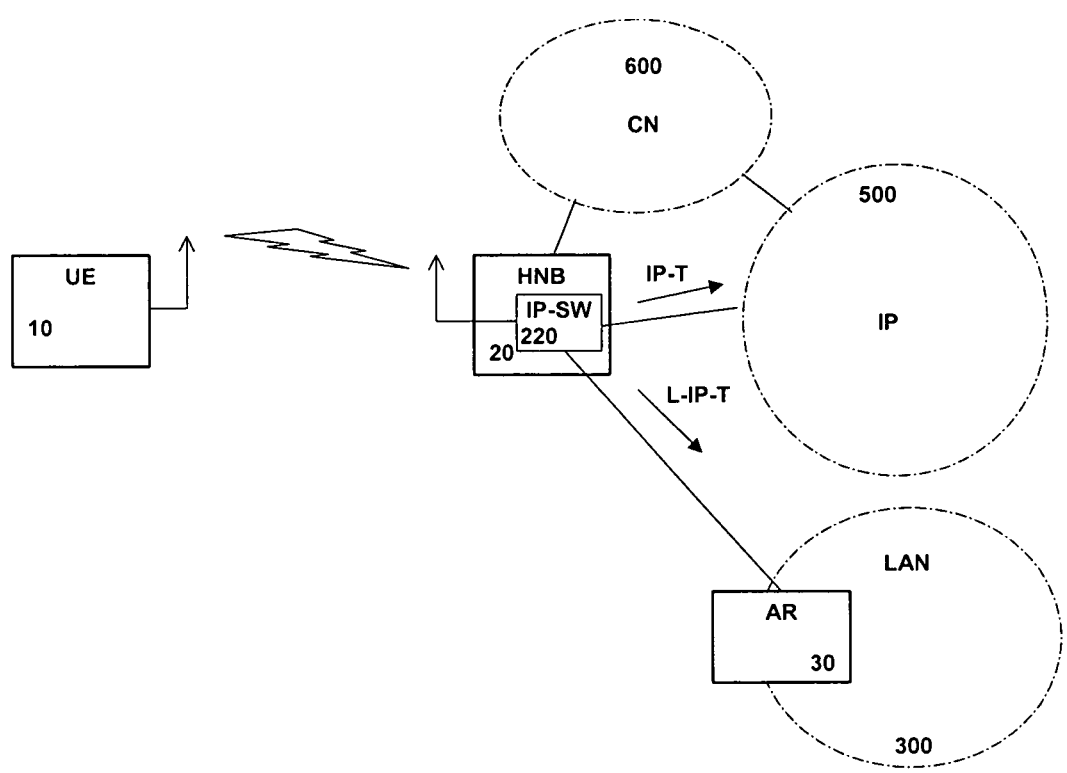
FIG. 1 shows a schematic network architecture with a HNB involving a link layer switching functionality according to some embodiments.

FIG. 1 shows a schematic network architecture comprising at least one HNB 20 with reduced gateway functionality in a subscriber home environment, e.g. within a building, and connected to an operator's core network (CN) 600, an IP network 500 and a home based LAN 300 with an access router (AR) 30. The HNB 20 comprises an IP switch (IP-SW) 220 for switching IP traffic directly to the IP network 500 or the LAN 300 without involvement of the CN 600. The IP switch 220 thus serves to provide a gateway functionality for LBO of local IP traffic (L-IP-T) and other IP traffic (IP-T). The IP traffic may originate from or terminate at a UE 10 which is wirelessly connected to the HNB 20 via an air interface.

A 3GPP specified radio interface in the HNB 20 works on a user plane based on an UE specific connection-oriented point-to-point link (i.e. bearer service), which means that the radio link between the UE 10 and the HNB 20 is not capable of broadcast transmission.

Due to the connection-oriented point-to-point links over the radio interface, neighbour discovery functions cannot be performed under control of the UE 10. In view of this, the serving HNB 20 of the UE 10 comprises an interface towards the LAN 300 and the IP network 500, which provides a termination point for the UE 10 from the LAN 300 and the IP network 500.

Thus, according to some embodiments, instead of implementing a full IP router functionality in the HNB 20 for local IP access (or LBO) services—like it would be in case of conventional gateway solutions, the gateway functionality at the HNB 20 can be simplified to operate as a switching or bridging function for user IP traffic between the LAN 300 (home based network) or the IP network 500 and an UE specific point-to-point link over the radio interface (bearer service). The switching or bridging functionality may be an IP aware functionality which means that this functionality provided by the IP switch 220 can behave as an "UE proxy" towards the LAN 300 or the IP network 500, so that it serves not only to assist the UE 10 in assigning an IP address and support neighbour discovery functions, but also to enable performing link layer mobility transparently to the UE 10 and eliminating the need for using some IP mobility mechanisms in the local IP access service area.

According to the Open Systems Interconnection Reference Model (OSI model), network architectures are divided into seven layers which, from top to bottom, are designated application, presentation, session, transport, network, link (or data-link), and physical layer. A layer can be regarded as a collection of conceptually similar functions that provide services to the layer above it and receives service from the layer below it. For example, a layer that provides error-free communications across a network provides the path needed by applications above it, while it calls the next lower layer to send and receive packets that make up the contents of the path.

In the present embodiments, link layer (also referred to as "L2") and network layer (also referred to as "L3") levels are distinguished. The network layer provides the functional and procedural means of transferring variable length data sequences from a source to a destination via one or more networks, while maintaining the quality of service requested by the transport layer. The network layer performs network routing functions, and might also perform fragmentation and reassembly, and report delivery errors. Routers operate at this layer—sending data through the extended network and making the Internet possible. A well-known example of a network layer protocol or L3 protocol is the Internet Protocol (IP). It manages the connectionless transfer of data one hop at a time, from end system to ingress router, router to router, and from egress router to destination end system. It is not responsible for reliable delivery to a next hop, but only for the detection of erroneous packets so that they may be discarded or corrected. When the medium of the next hop cannot accept a packet in its current length, IP is responsible for fragmenting the packet into sufficiently small packets which a medium can accept.

The (data) link layer (L2) provides functional and procedural means to transfer data between network entities and to detect and possibly correct errors that may occur in the physical layer (also referred to as "L1"). Originally, this layer was intended for point-to-point and point-to-multipoint media, characteristic of wide area media in the telephone system. Connection-oriented wide area network (WAN) data link protocols, in addition to framing, detect and may correct errors. They may also be capable of controlling the rate of transmission. Furthermore LANs are based on an Ethernet specification which is a family of frame-based computer networking technologies. The name comes from the physical concept of the "ether". It defines a number of wiring and signalling standards for the physical layer of the OSI networking model, through means of network access at a Media Access Control (MAC) layer, and a common addressing format. Ethernet is standardized as IEEE 802.3.

The proposed IP switch 220 may be provided in a user plane interface of the HNB 20 and could be implemented as link layer device (e.g. L2 switch) from the point of view of the LAN 300 and the IP network 500. This means that from the view point of the UE 10 or the HNB 20, its local IP point of attachment is located in the external next hop router seen from the HNB 20. In the LAN 300, as a home or local area network (office, campus etc.), this next hop router may be a default gateway to external networks, provided e.g. in a separate digital subscriber line (DSL) router box. Or, in case of the IP network 500 it may be the nearest IP router in the Internet service provider (ISP) network.

In case an IP aware bridging or switching function is realized in the IP switch 220, the HNB 20 can perform IP lookup in order to forward user downlink traffic to a corresponding UE specific bearer service (i.e. point-to-point link) over the radio interface. Another alternative for implementing the IP aware bridging or switching function could be to model the IP switch 220 as a wireless L2 switch. In this case, the forwarding decision for user local IP traffic from the LAN 300 or the IP network 500 to the corresponding UE specific bearer service can be done based on UE specific link layer addresses (e.g. Ethernet MAC addresses) as explained later.

The suggested IP switch 220 in the HNB 20 thus provides the advantage that there is no need to run an IP routing protocol, to perform router advertisements or the like. In the uplink direction the HNB 20 simply forwards the local IP access traffic directly to its network interface in the LAN 300 or the IP network 500 and does not require any tunnelling protocol or other IP tunnelling.

The advantage of the proposed HNB 20 with IP switch 220 can be recognized from local IP access service with IP session continuation support between multiple HNBs or other kinds of base stations connected to the same local area without necessitating any mobility agent node (e.g. home agent in proxy mobile IP) in the LAN 300 or the IP network 500.

Figure 2:
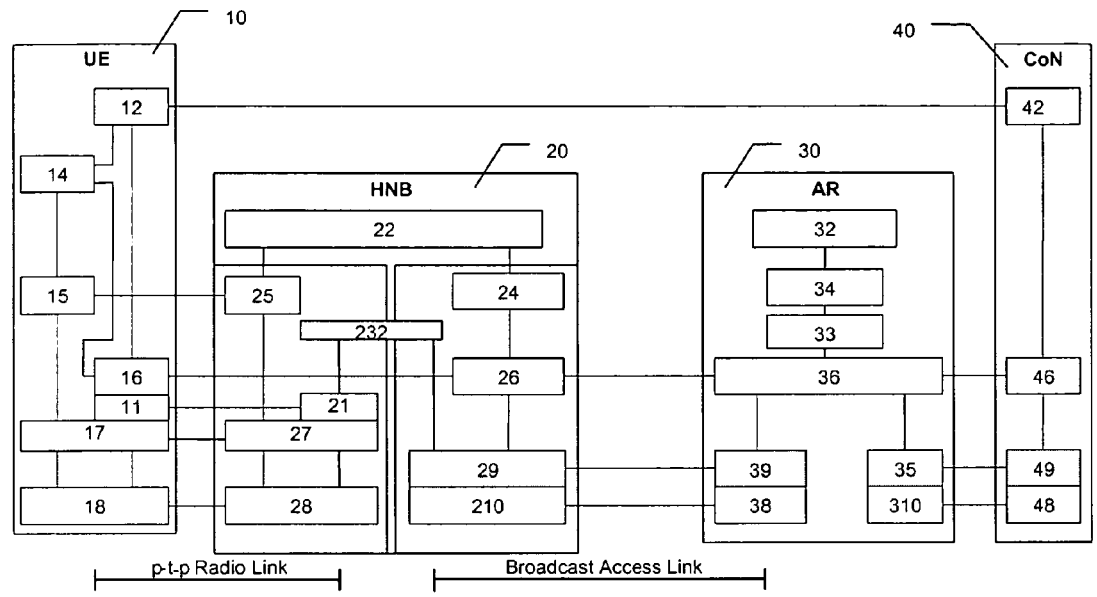
FIG. 2 shows a more detailed architecture of involved network elements according to a first embodiment.

FIG. 2 shows a schematic block diagram of a protocol related architecture of network elements involved in an LBO operation to the home based LAN 300 or the IP network 500. The block diagram of FIG. 2 is based on the above OSI model, wherein components relating to higher protocol layers are shown on top of components which relate to lower protocol levels.

As can be gathered from the connections between the processing blocks of FIG. 2, the UE 10 and a correspondent node (CoN) 40 at or behind the LAN 300 or the IP network 500 directly communicate with each other at the highest protocol level (application protocol), wherein the lower protocol levels provide different levels and kinds of support for this direct communicaton. Lower level communications exist to and between the other involved network elements, i.e. the HNB 20 and the access router 30. Between the HNB 20 and the UE 10, a point-to-point radio link is provided, while between the HNB 20 and the access router 30 a broadcast access link is established.

The protocol stack at the UE 10 comprises from top to bottom an end-to-end application 12, a terminal control function 14, a radio resource control (RRC) function 15, an IP version 4 (IPv4) and/or IP version 6 (IPv6) function 16, a packet data control protocol (PDCP) function 11, a radio link control (RLC) and/or MAC function 17, and a radio (L1) function 18.

The HNB 20 comprises from top to bottom a base station control function 22 connecting separate base station radio interface and base station network interface portions. The base station radio interface portion comprises from top to bottom an RRC function 25, a bridge function 223, a PDCP function 21, a RLC/MAC function 27, and a radio L1 function 28. The base station network interface portion comprises from top to bottom a user datagram protocol (UDP) and/or transmission control protocol (TCP) and/or simple computer telephony protocol (SCTP) function 24.

According to the first embodiment, the bridging function 234 bridges the base station radio interface portion and the base station network interface portion by providing a link layer switching or bridging functionality. Additionally, the base station network interface portion comprises an IPv4/IPv6 and/or Internet control message protocol (ICMP) function 26, a data link layer function 29, and a physical layer function 210. The protocol stack at the access router 30 comprises an access router control function 32, an UDP/TCP/SCTP function 34, an IPv4/IPv6/ICMP function 33, an IP routing and forwarding function 36, and respective data link layer and physical layer functions 39, 38 and 35, 310 at both interface sides.

Finally, the correspondent node 40 comprises an end-to-end application function 42 which communicates with the respective end-to-end application function 12 at the UE 10, an IPv4/IPv6 function 46, a data link layer function 49, and a physical layer function 48.

Details of the processing and purpose of all the above protocol functions are omitted for reasons of brevity.

In the first embodiment of FIG. 2, the radio interface of the point-to-point radio link is assumed to be in accordance with the evolved packet system (EPS) bearer model, which has been designed to support seamless mobility and quality of service with minimal latency for IP services. Compared to former network architectures, the radio network controller (RNC) is eliminated from the data path and its functions are incorporated into the HNB 20, which lowers delays and optimizes network performance.

The HNB 20 connects physically to the LAN 300 or the IP network 500 as broadcast capable media. The bridging function 232 between the radio link of the radio interface portion and the access link of the network interface portion can be configured to implement a minimal set of 3GPP standard gateway functions for providing local IP access service to the served UEs. These local gateway functions can be considered as virtual gateway functions in the HNB 20 because EPS bearer handling for local IP access service could be handled over the access point protocol using a modified UE requested packet data network connectivity procedure.

Thus, in the first embodiment, the local gateway functionality in the HNB 20 can be implemented as a wireless L2 switch similar to a simple wireless LAN (WLAN) access point with the exception that a point-to-point radio link is used over the air interface. Accordingly, the local gateway function can be implemented as a link layer or L2 device, so that it is possible to connect one or more HNBs into one IP subnet comprised of an L2 switched network, e.g. a home Ethernet LAN.

The virtual local gateway in the HNB 20 provides a simple link layer or L2 bridging or switching function between the access link to the access router 30 and the point-to-point radio link towards the UE 10. The bridging function 232 thus requires less processing power in the HNB 20 because network layer or L3 processing can be omitted in a bridging function 232. This solution enables an ordinary 3GPP IP stack implementation in the UE 10 using a dedicated EPS bearer for local IP access. Furthermore, no modifications to the "of the shelf" access router 30 are required to connect the proposed HNB 20 to the LAN 300. The access router 30, as a default gateway, behaves as a regular access router for packet routing and neighbour discovery in the LAN 300.

With the proposed reduced local gateway functionality one access router can serve multiple HNBs connected to the same link. Now, inter HNB handovers between these HNBs can be handled at link layer (L2) and budget L2 switches can be used for transport issues. This is beneficial, as existing infrastructure can be used. The bridging function 232 can be used to connect the radio link and the access link together between the UE 10, the HNB 20 and the access router 30 to emulate an Ethernet connection to the access router 30, similar to a WLAN access point.

As an example, Open Base Station Architecture Initiative (OBSAI) compliant products can be used to implement the HNB 20. The concerned base station merely needs to contain a link layer (L2) switch transport interface for enabling implementation of the proposed bridging functions 232, 234.

Figure 3:
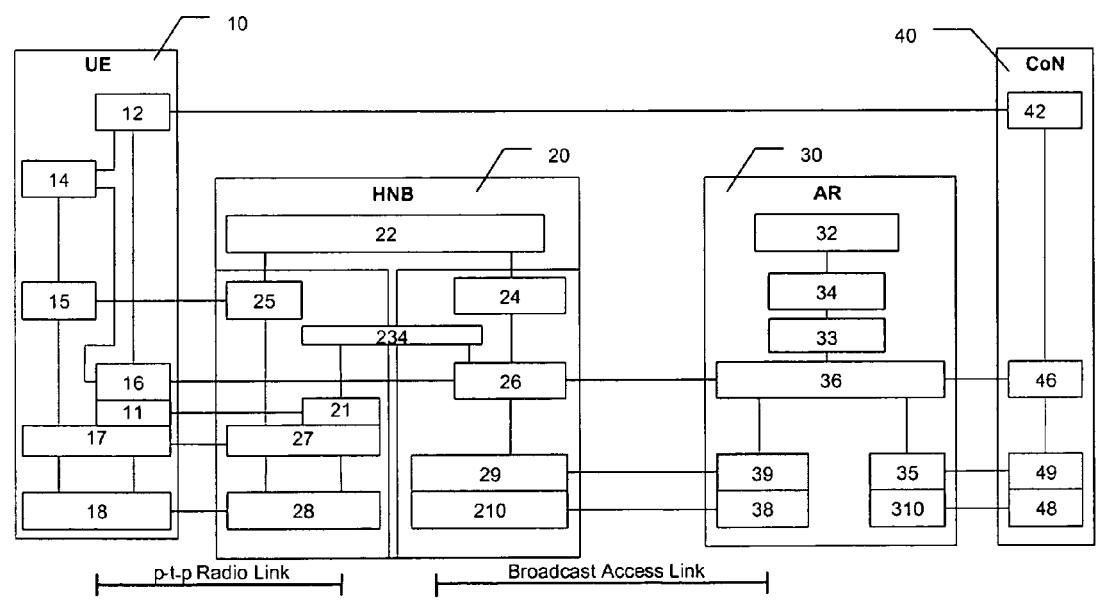
FIG. 3 shows a more detailed architecture of involved network elements according to a second embodiment.

FIG. 3 shows a schematic block diagram of protocol architecture similar to FIG. 2, according to a second embodiment. Here, the local gateway of the HNB 20 is configured as a wireless IP aware L2 switch to provide a more intelligent L2 device which is aware of user traffic at upper layers. However, the clean functional split between the network layer (L3) at the separate access router 30 and the link layer (L2) still enables to connect one or more access points (e.g. HNB) into one IP subnet comprised of an L2 switched network.

As can be gathered from FIG. 3, the bridging function 234 now connects to the IPv4/IPv6/ICMP function 26 which then connects to the data link layer function 29 of the link layer. Thereby, awareness of user traffic at upper layers can be achieved.

Still, no modifications to the "of the shelf" access router 30 are required to connect the HNB 20 to the LAN 300. The HNB 20 is able to proxy an Ethernet connection of the UE 10 to the access router 30 when the UE 10 does not need to perform neighbour discovery procedures over the point-to-point radio link. The radio link and the access link are able to use different link layer addressing schemes which provides the advantage that Ethernet frames do not need to be sent over the radio link. Furthermore, forwarding decisions from the access link to the radio link can be controlled based on an UE specific IP address that is mapped to an Ethernet MAC address of the HNB 20, so that less forwarding table entries are required in intermediate L2 switches.

Again, OBSAI compliant products can be used to implement the HNB 20 according to the second embodiment. A corresponding base station may contain an integrated L2 switch transport interface in its access link.

In the following, the bridging functions of the first and second embodiments are described in more detail based on FIGS. 4 and 5.

Figure 4:
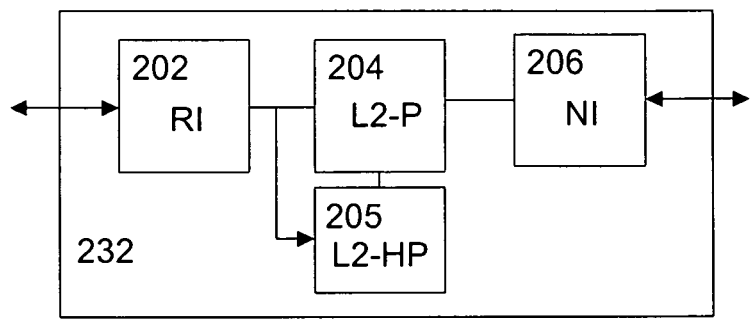
FIG. 4 shows a schematic block diagram of a bridging functionality according to the first embodiment.

FIG. 4 shows a schematic block diagram of the functions provided by the bridging function 232 of the HNB 20 according to the first embodiment. A radio interface (RI) function 202 and a network interface (NI) function 206 are shown, which correspond to those parts of the bridging function 232 which interconnect to the base station radio interface portion and the base station network interface portion of the HNB 20. Additionally, the bridging function 232 comprises a link layer or L2 processing function (L2-P) 204 and a link layer or L2 header processing function (L2-HP) 205. The radio interface function 202 is configured to detect L2 packet boundaries (link layer frames) and can thus use this information within a scheduling algorithm for transmission over the air interface.

To achieve the bridging or switching functionality, the L2 header processing function 205 extracts L2 headers for processing to provide the wireless L2 switching function for bridging. The network interface function 206 serves to emulate an UE Ethernet interface towards the LAN 300, while the radio interface function 202 can remove the Ethernet frames over the point-to-point radio link. The layer 2 processing function 204 provides user traffic mapping to EPS bearer service for LBO based on link layer addresses provided by the L2 header processing function 205. Additionally, the proxy function of the HNB 20 to the UE 10 can be achieved by the L2 processing function 204 by assigning a UE specific link layer address (LLA) such as an Ethernet MAC address to the network interface function 206, so that no IP lookup is required in the bridging decision at the L2 processing function 204.

Additionally, the radio interface function 202 or the L2 processing function 204 may be configured to filter UE neighbour discovery procedures with broadcast functionalities. Similarly, ICMP broadcast messages can be filtered over the point-to-point radio link.

The suggested modification by introduction of the bridging function 232 may require a new local IP mobility protocol for L2 to L3 interactions in network controlled fast/seamless handovers (e.g. NETLMM extensions to current ICMPv6) in case the next hop router seen from the HNB 20 and UE 10 is located behind multiple router hops.

Figure 5:
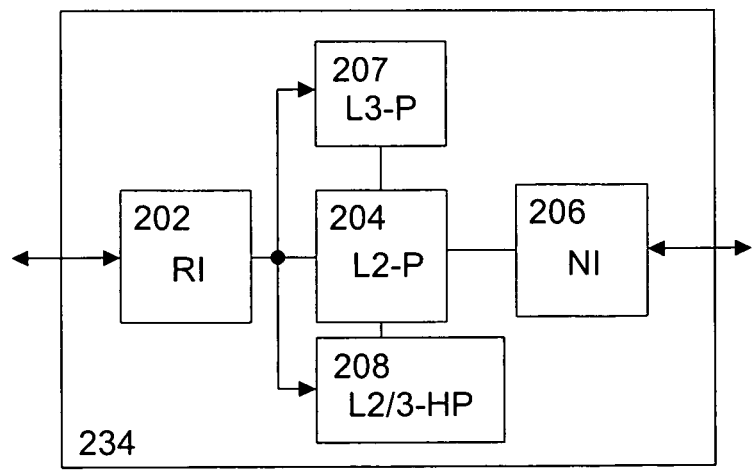
FIG. 5 shows a schematic block diagram of a bridging functionality according to the second embodiment.

FIG. 5 shows a schematic block diagram of the individual functions provided at the bridging function 234 according to the second embodiment.

In addition to the functions described in connection with FIG. 4, a network layer (L3) processing function (L3-P) 207 is provided and the header processing function is extended to a L2 and L3 header processing function (L2/3-HP) 208.

The enhanced header processing function 208 and the L3 processing function 207 are provided to enable L3 awareness in the bridging function so as to map e.g. a user's Diffserv (i.e. differentiated services) marked packets to corresponding link layer services (e.g. EPS bearer) in the air interface and/or perform IP header compression and ciphering according to the PDCP protocol. Furthermore, the PDCP function 21, and the RLC/MAC function 27 of the radio link related stack of the HNB 20 can be made aware of IP packet boundaries and service flows (e.g. detect voice over IP (VoIP) may use this information within the scheduling algorithm for transmission over the air interface.

The HNB 20 according to the second embodiment is capable of implementing local IP mobility extensions (e.g. for NETLMM) that can be hidden from the UE 10. It is further capable to implement IPv4/IPv6 interworking by a corresponding functionality at the L3 processing function 207 and/or the L2/3 header processing function 208. This provides the advantage that the IP stack at the UE 10 can use a standard EPS bearer model, since the local IP address is transparent to the UE 10.

The enhanced L2/3 header processing function 208 can be provided to implement header compression between the UE 10 and the access router 30.

A forwarding decision by the L2 processing function 204 from the access link to the radio point-to-point link can be achieved based on an IP lookup, as a LLA (e.g. Ethernet MAC address) is assumed to be used in the access link to transport user IP traffic in the LAN 300, which may require partial IP router stack implementation in the HNB 20.

Again, a new local IP mobility protocol may be required for L2 to L3 interactions in network controlled fast/seamless handovers in case the next hop router seen from the HNB 20 and UE 10 is located behind multiple router hops.

Figure 6:
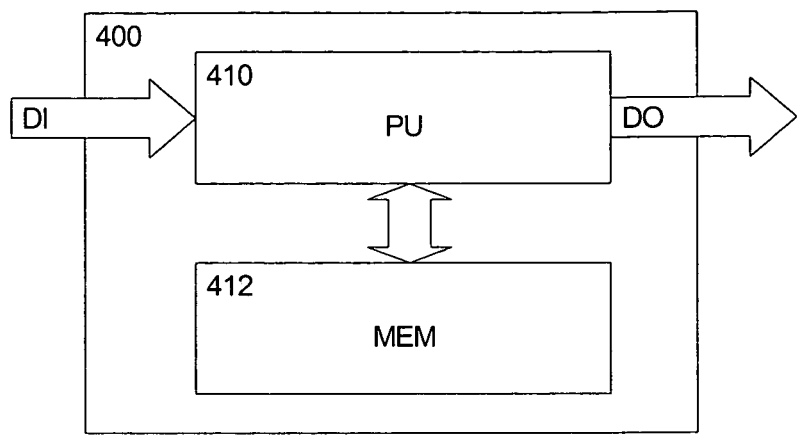
FIG. 6 shows a schematic block diagram of a software based implementation according to a third embodiment.

FIG. 6 shows a schematic block diagram of an alternative software-based implementation according to a third embodiment. The required functionality can be implemented in any base station type network entity 400 with a processing unit 410, which may be any processor or computer device with a control unit which performs control based on software routines of a control program stored in a memory 412. The control program may also be stored separately on a computer readable medium. Program code instructions are fetched from the memory 412 and are loaded to a control unit of the processing unit 410 in order to perform the processing steps of the device-specific functionalities described in connection with FIGS. 2 to 5, which may be implemented as the above mentioned software routines. The processing steps may be performed on the basis of input data DI and may generate output data DO. In case of an uplink traffic via the HNB 20, the input data DI may correspond to an IP traffic received via the point-to-point radio link from the UE 10, and the output data DO may correspond to LBO IP traffic transmitted over the broadcast access link. For downlink traffic, the situation is vice versa.

Consequently, the functionalities of the above first and second embodiments of the HNB 20 may be implemented as a computer program product comprising code means for generating each individual step of the processing and/or signalling procedures for the respective entities or functions when run on a computer device or data processor of the respective entity at the HNB 20 or any corresponding base station or access device entity.

In summary the present invention relates to a method, an apparatus, and a computer program product for providing access via a cellular access network to a packet-switched network, wherein a terminal-specific connection-oriented point-to-point link is set up between a terminal device (e.g. UE 10) and a cellular base station device (e.g. HNB 20), and the terminal-specific connection-oriented point-to-point link is switched at the cellular base station device on a link layer level to the packet-switched network, so that a point of attachment for said terminal device is located in the packet-switched network. Furthermore, a terminal-specific termination point for the packet-switched network is provided at the cellular base station device.

It is apparent that the invention can easily be extended to any service and network environment where a base station type device or access device can be used for bridging a radio link from a terminal device to a broadcast access link of a packet-switched network. The proposed embodiments can be implemented in connection with any base station device deployed in a wireless network. The embodiments may thus vary within the scope of the attached claims.

The invention claimed is:

1. An apparatus comprising one or more processors and one or more memories including computer program code, the one or more memories and the computer program code configured, with the one or more processors, to cause the apparatus to perform at least the following:
setting up a terminal-specific connection- oriented point-to-point link to provide access to a local packet-switched network;
switching said terminal-specific connection-oriented point-to-point link on a link layer level to a packet-switched network, so that a point of attachment for said access is located in said local packet-switched network;
providing a terminal-specific termination point for said local packet-switched network; and
transferring user equipment traffic to provide local internet protocol access service with local switching over the terminal-specific connection-oriented point-to-point link.

2. The apparatus according to claim 1, wherein the one or more memories and the computer program code are further configured, with the one or more processors, to cause the apparatus to handle handover-related session continuation at said link layer level.

3. The apparatus according to claim 1, wherein the one or more memories and the computer program code are further configured, with the one or more processors, to cause the apparatus to perform protocol lookup in order to forward user downlink traffic to a corresponding terminal-specific connection-oriented point-to-point link.

4. The apparatus according to claim 1, wherein the one or more memories and the computer program code are further configured, with the one or more processors, to cause the apparatus to derive a forwarding decision for user downlink traffic from said local packet-switched network to a corresponding terminal-specific connection-oriented point-to-point link from an assigned terminal-specific link layer address.

5. The apparatus according to claim 1, wherein the one or more memories and the computer program code are further configured, with the one or more processors, to cause the apparatus to forward received access traffic directly to said local packet-switched network.

6. The apparatus according to claim 1, wherein the one or more memories and the computer program code are further configured, with the one or more processors, to cause the apparatus to use link layer frame information for scheduling over-the-air transmission.

7. The apparatus according to claim 1 wherein the one or more memories and the computer program code are further configured, with the one or more processors, to cause the apparatus to derive switching information based on received link layer headers.

8. The apparatus according to claim 1, wherein the one or more memories and the computer program code are further configured, with the one or more processors, to cause the apparatus to emulate a terminal-specific Ethernet interface towards said local packet-switched network.

9. The apparatus according to claim 1, wherein the one or more memories and the computer program code are further configured, with the one or more processors, to cause the apparatus to perform user traffic mapping to said terminal-specific connection-oriented point-to-point link at said link layer level based on link layer addresses.

10. The apparatus according to claim 1, wherein the one or more memories and the computer program code are further configured, with the one or more processors, to cause the apparatus to perform at least one of mapping marked user packets to corresponding link layer services and performing application layer header compression and ciphering.

11. The apparatus according to claim 10, wherein the one or more memories and the computer program code are further configured, with the one or more processors, to cause the apparatus to derive a decision for forwarding traffic to said terminal-specific connection-oriented point-to-point link based on a mapping of application layer addresses to link layer addresses.

12. A method comprising:
  setting up a terminal-specific connection-oriented point-to-point link between a terminal device and a cellular base station device to provide access to a local packet-switched network;
  switching said terminal-specific connection-oriented point-to-point link at said cellular base station device on a link layer level to said local packet-switched network, so that a point of attachment for said terminal device is located in said local packet-switched network;
  providing at said cellular base station device a terminal-specific termination point for said local packet-switched network; and
  transferring terminal device equipment traffic to provide local internet protocol access service with local switching over the terminal-specific connection-oriented point-to-point link.

13. The method according to claim 12, further comprising separating an application layer router function from said base station device to an external node of said packet-switched network.

14. The method according to claim 12, further comprising handling hand-over-related session continuation at said link layer level.

15. The method according to claim 12, further comprising assigning a terminal-specific link layer address at said base station device and deriving a forwarding decision for user downlink traffic from said assigned terminal-specific link layer address.

16. The method according to claim 12, further comprising emulating at said base station device a terminal-specific Ethernet interface towards said packet-switched network.

17. The method according to claim 12, further comprising mapping at said base station device user traffic to said terminal-specific connection-oriented point-to-point link at said link layer level based on link layer addresses.

18. The method according to claim 12, further comprising mapping at said base station device marked application layer user packets to corresponding link layer services.

19. A computer program product comprising a non-transitory computer-readable medium storing instructions for execution by one or more processors, wherein the computer-readable medium includes instructions for performing at least the following:
  setting up a terminal-specific connection-oriented point-to-point link to provide access to a local packet-switched network;
  switching said terminal-specific connection-oriented point-to-point link on a link layer level to a packet-switched network, so that a point of attachment for said access is located in said local packet-switched network;
  providing a terminal-specific termination point for said local packet-switched network; and
  transferring user equipment traffic to provide local internet protocol access service with local switching over the terminal-specific connection-oriented point-to-point link.

* * * * *